United States Patent
Burgess

(10) Patent No.: US 7,052,379 B2
(45) Date of Patent: May 30, 2006

(54) METHODS AND APPARATUS FOR MACHINING A COUPLING

(75) Inventor: Greg M. Burgess, Maineville, OH (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 10/330,384

(22) Filed: Dec. 27, 2002

(65) Prior Publication Data

US 2004/0132390 A1   Jul. 8, 2004

(51) Int. Cl.
*B24B 7/00* (2006.01)

(52) U.S. Cl. .................. 451/231; 451/246; 451/450

(58) Field of Classification Search .............. 451/53, 451/178, 242, 246, 231, 253, 254, 258, 449, 451/450
See application file for complete search history.

(56) References Cited

U.S. PATENT DOCUMENTS

| | | | |
|---|---|---|---|
| 2,746,220 A * | 5/1956 | Thomas | 451/449 |
| 4,016,395 A | 4/1977 | Rietveld | |
| 4,570,609 A * | 2/1986 | Hogue | 125/13.01 |
| 4,791,761 A * | 12/1988 | Goudie | 52/109 |
| 4,841,126 A | 6/1989 | Graeber | |
| 5,139,005 A | 8/1992 | Dodd | |
| 5,220,749 A | 6/1993 | Youden et al. | |
| 5,544,873 A | 8/1996 | Vickers et al. | |
| 5,744,775 A | 4/1998 | Yasuda et al. | |
| 5,813,593 A | 9/1998 | Galaske, Jr. | |
| 5,846,125 A * | 12/1998 | Robichon | 451/450 |
| 5,847,350 A | 12/1998 | Dorrel et al. | |
| 5,852,269 A | 12/1998 | Toyonaga et al. | |
| 5,993,297 A * | 11/1999 | Hyatt et al. | 451/53 |
| 6,071,047 A * | 6/2000 | Nakai | 409/131 |
| 6,158,104 A | 12/2000 | Roberts et al. | |
| 6,196,902 B1 * | 3/2001 | Gazca-Ortiz et al. | 451/242 |
| 6,306,022 B1 * | 10/2001 | Tung et al. | 451/290 |
| 6,520,842 B1 * | 2/2003 | Yasuie et al. | 451/47 |

FOREIGN PATENT DOCUMENTS

EP   1184122   3/2002

* cited by examiner

*Primary Examiner*—Eileen P. Morgan
(74) *Attorney, Agent, or Firm*—William Scott Andes; Armstrong Teasdale LLP

(57) ABSTRACT

A method facilitates fabricating a coupling including a first annular coupling member and a second annular coupling member. The method comprises coupling the first coupling member to a machine assembly that includes a plurality of grinding wheels coupled to a tool storage member, machining a plurality of troughs in the first coupling member using at least one of the plurality of grinding wheels, such that at least one projection is defined between adjacent troughs, coupling the second coupling member to the machine assembly, and machining a plurality of troughs in the second coupling member using at least one of the plurality of grinding wheels, such that the second coupling member is configured to rotatably couple to the first coupling member.

7 Claims, 7 Drawing Sheets

METHODS AND APPARATUS FOR MACHINING A COUPLING

BACKGROUND OF THE INVENTION

This invention relates generally to couplings, and more specifically to methods and apparatus for machining a coupling.

Components manufactured for turbine engines may have tight tolerances and/or rigid specifications that must be satisfied for the components to function properly with other turbine engine systems. For example, rotating components within the engine may be coupled with multi-piece couplings that are rotatably mated together. Because the components are mated together, manufacturing the components within the rigid tolerances may be essential to the performance of the component.

As such, manufacturing such components may be a time-consuming and laborious task. To facilitate streamlining the manufacturing process of such components, at least some known processes used a single-purpose machine that facilitates processing each component in a single-piece flow. However, such processes require frequent process setup changes to accommodate different component configurations based on the demand for each product. Specifically, known single-purpose machines include one fixture and one grinding wheel that must be manually removed and replaced each time a different component configuration is required. In addition, to facilitate reducing process variation, each time grinding wheel and/or fixture is interchanged, manual machine adjustments must typically be made prior to commencing production.

BRIEF DESCRIPTION OF THE INVENTION

In one aspect a method for fabricating a coupling including a first annular coupling member and a second annular coupling member is provided. The method comprises coupling the first coupling member to a machine assembly that includes a plurality of grinding wheels coupled to a tool storage member, machining a plurality of troughs in the first coupling member using at least one of the plurality of grinding wheels, such that at least one projection is defined between adjacent troughs, coupling the second coupling member to the machine assembly, and machining a plurality of troughs in the second coupling member using at least one of the plurality of grinding wheels, such that the second coupling member is configured to rotatably couple to the first coupling member.

In another aspect of the invention, a machine assembly for use in machining a coupling is provided. The machine tool comprises a machine tool, at least two grinding wheels, and a tool storage member that is coupled to the machine tool. The at least two grinding wheels are removably coupled to the tool storage member. The machine tool is configured to use at least one of the two grinding wheels to machine a plurality of troughs in at least one generally annular coupling member, wherein at least one projection is defined between adjacent troughs, and such that the coupling member is configured to be rotationally coupled to another coupling member using the projections and troughs.

In a further aspect, a grinding wheel is provided. The grinding wheel includes a body, at least one grinding surface extending outwardly from the body, and a cooling system extending through at least one of the body and the at least one grinding surface for supplying coolant to the at least one grinding surface.

DETAILED DESCRIPTION OF THE INVENTION

Figure 1:
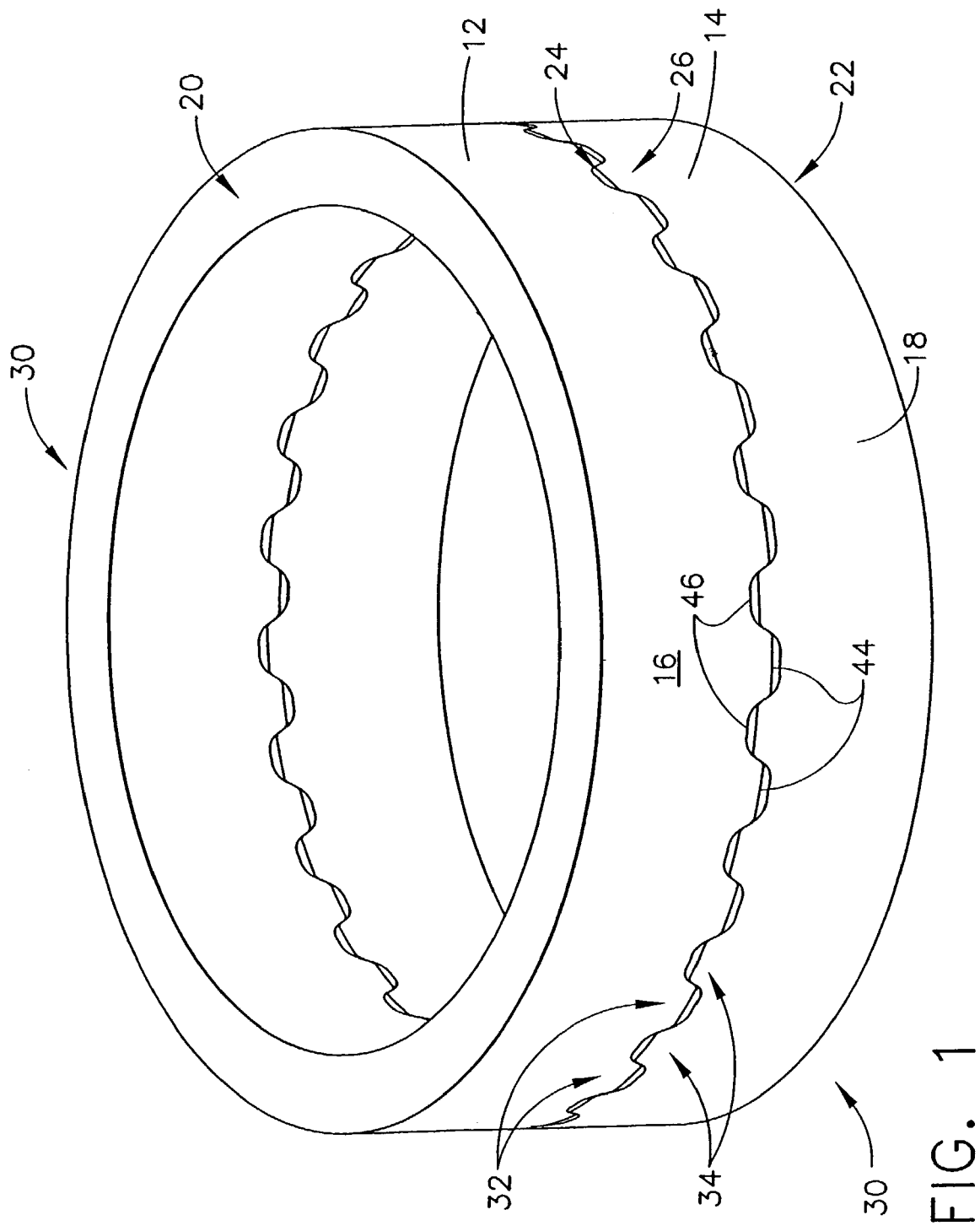
FIG. 1 is a perspective view of an exemplary coupling.
Figure 2:
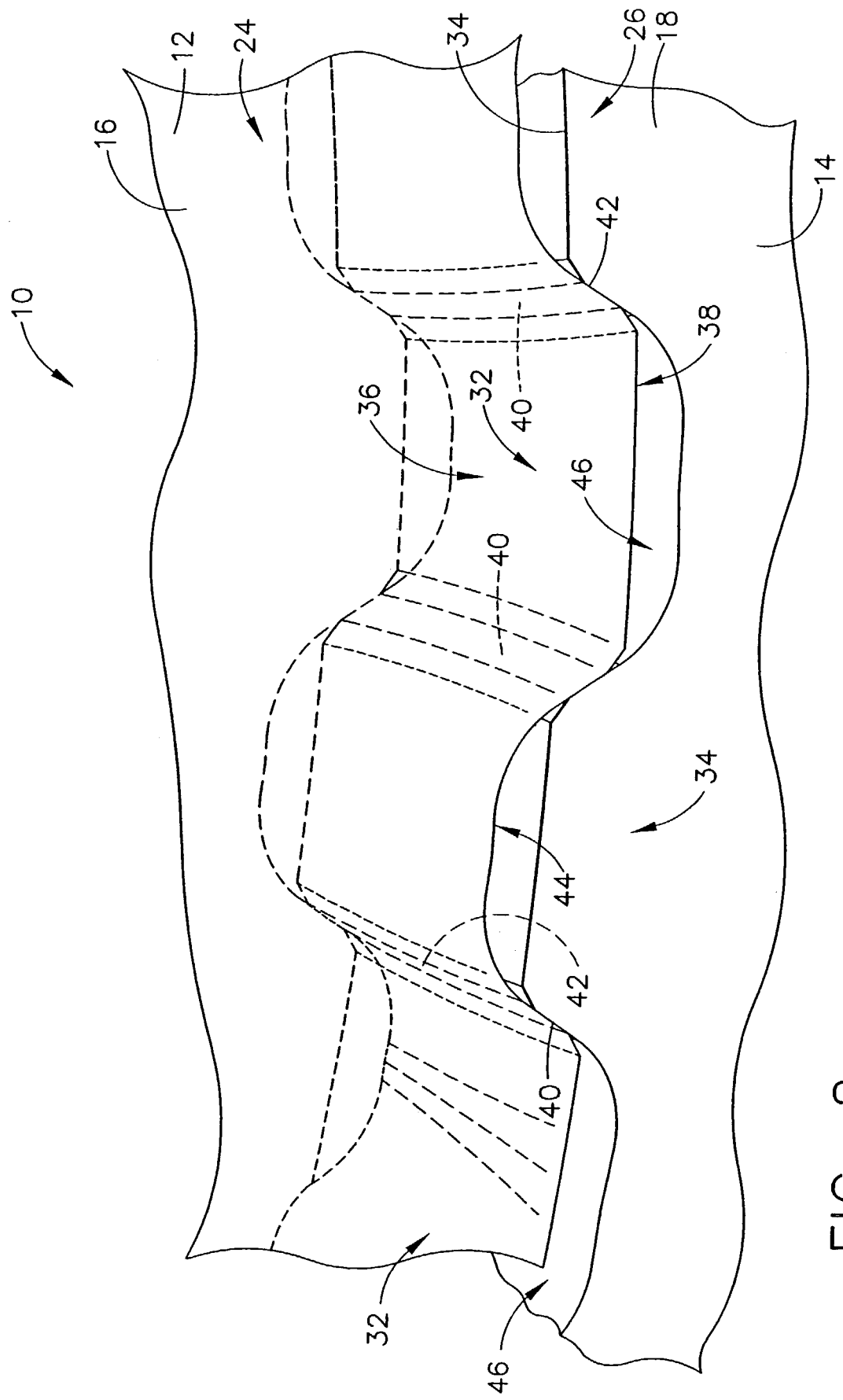
FIG. 2 is a perspective view of a portion of the coupling shown in FIG. 1.

FIG. 1 is a perspective view of an exemplary coupling 10. FIG. 2 is a perspective view of a portion of coupling 10. Coupling 10 includes a first coupling member 12 and a second coupling member 14. Coupling members 12 and 14 each include a substantially cylindrically shaped body 16 and 18, respectively. Bodies 16 and 18 are each annular and extend between a respective first end 20 or 22 and a respective second end 24 or 26. A central axis 27 respectively, extends through bodies 16 and 18. A bore 28 and 30 extends through each respective body 16 and 18 between each respective first end 20 or 22 and each respective second end 24 and 26. More specifically, bores 28 and 30 are substantially concentric with respect to bodies 16 and 18, respectively.

A plurality of teeth 32 extend outwardly from each respective body second end 28 and 30. More specifically, each tooth 32 extends outwardly from a respective root 36 to a respective tip 38. More specifically, each tip 38 is truncated and forms a mating surfaces 40. A plurality of respective troughs 44 and 46 are defined between adjacent teeth 32.

In the exemplary embodiment, members 12 and 14 are rotatably coupled together. More specifically, when coupled together, members 12 and 14 are aligned such that teeth 32 extending from body 16 are aligned with, and received within troughs 46, and such that teeth 32 extending from body 18 are aligned with, and received within troughs 44 such that rotational movement of body 16 or 18 with respect to the other body 18 or 16, respectively, is prevented.

Figure 3:
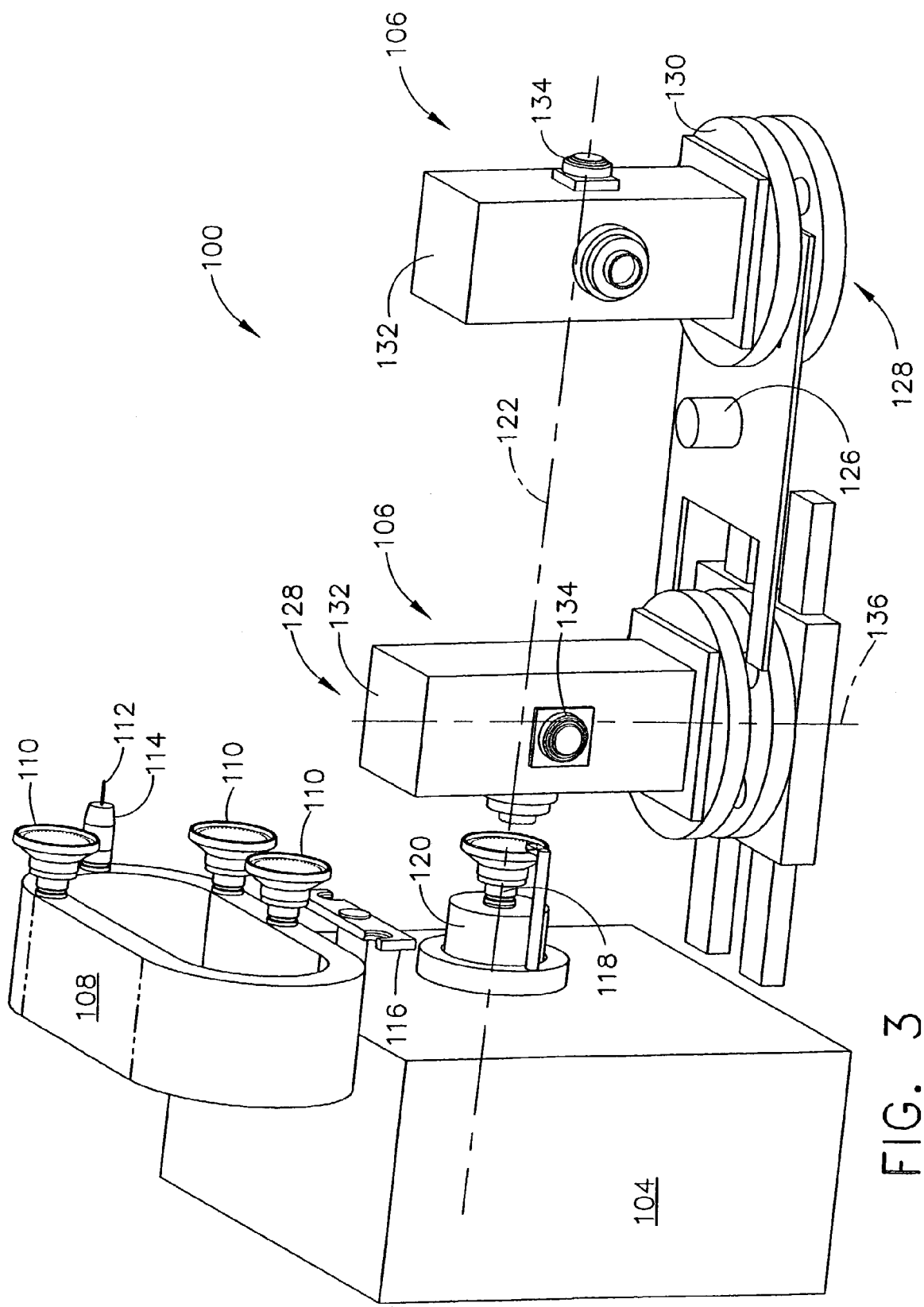
FIG. 3 is a perspective view of an exemplary machining assembly for fabricating a coupling, such as the coupling shown in FIG. 1.

FIG. 3 is a perspective view of an exemplary machining assembly 100 for machining a coupling, such as coupling 10 (shown in FIGS. 1 and 2). Assembly 100 includes a machine base 102, a machine tool 104, and a pallet assembly 106. Machine tool 104 is coupled to base 102 and includes a tool storage carousel 108 moveably coupled thereto in any suitable manner. In one embodiment, machine tool 104 is a computer numeric control (CNC) machining center. Carousel 108 includes a plurality of grinding wheels 110 that are removably coupled thereto in any suitable manner, and may also include any number of other machining tools 112 and/or inspection tools 114 that are also removably coupled thereto in any suitable manner. Machine tool 104 also includes an automatic tool changer 116 coupled thereto in any suitable manner, a scrubber assembly 118 movably coupled thereto in any suitable manner, and a chuck 120. Chuck 120 includes a tool, and more specifically in the exemplary embodiment, grinding wheel 110, coupled thereto. Tool changer 116 removes a tool from chuck 116 and replaces the removed tool with another tool selected from carousel 108. Chuck 120 is configured to rotate about an axis of rotation 122. Scrubber assembly 118 is also rotatable about axis of rotation 122 and provides coolant to a tool.

Pallet assembly 106 includes a pallet base 124, an automatic pallet changer 126, and a plurality of pallets 128. Pallets 128 are each removably coupled to base 102 and each includes a fixture base 130 and a fixture tower 132 that extends outwardly from fixture base 130. Each fixture tower 130 includes a plurality of quick-change fixtures 134 coupled thereto in any suitable manner. Fixtures 134 are each removably coupled to at least one of coupling members 12 and 14, and a dressing roll (not shown in FIG. 3). Accordingly, each fixture tower 130 can include a plurality of fixtures 134, wherein each fixture is configured to couple with a different configuration of a coupling member 12 and 14, or a dressing roll.

Each pallet 128 is removably coupled to pallet base 124. Pallet changer 126 couples and uncouples each pallet 128 to pallet base 124. Pallet base 124 is positionable along axis 122, and each pallet 128 is rotatable with respect to pallet base 124 along an axis of rotation 136 when a pallet 128 is coupled to pallet base 124.

Figure 4:
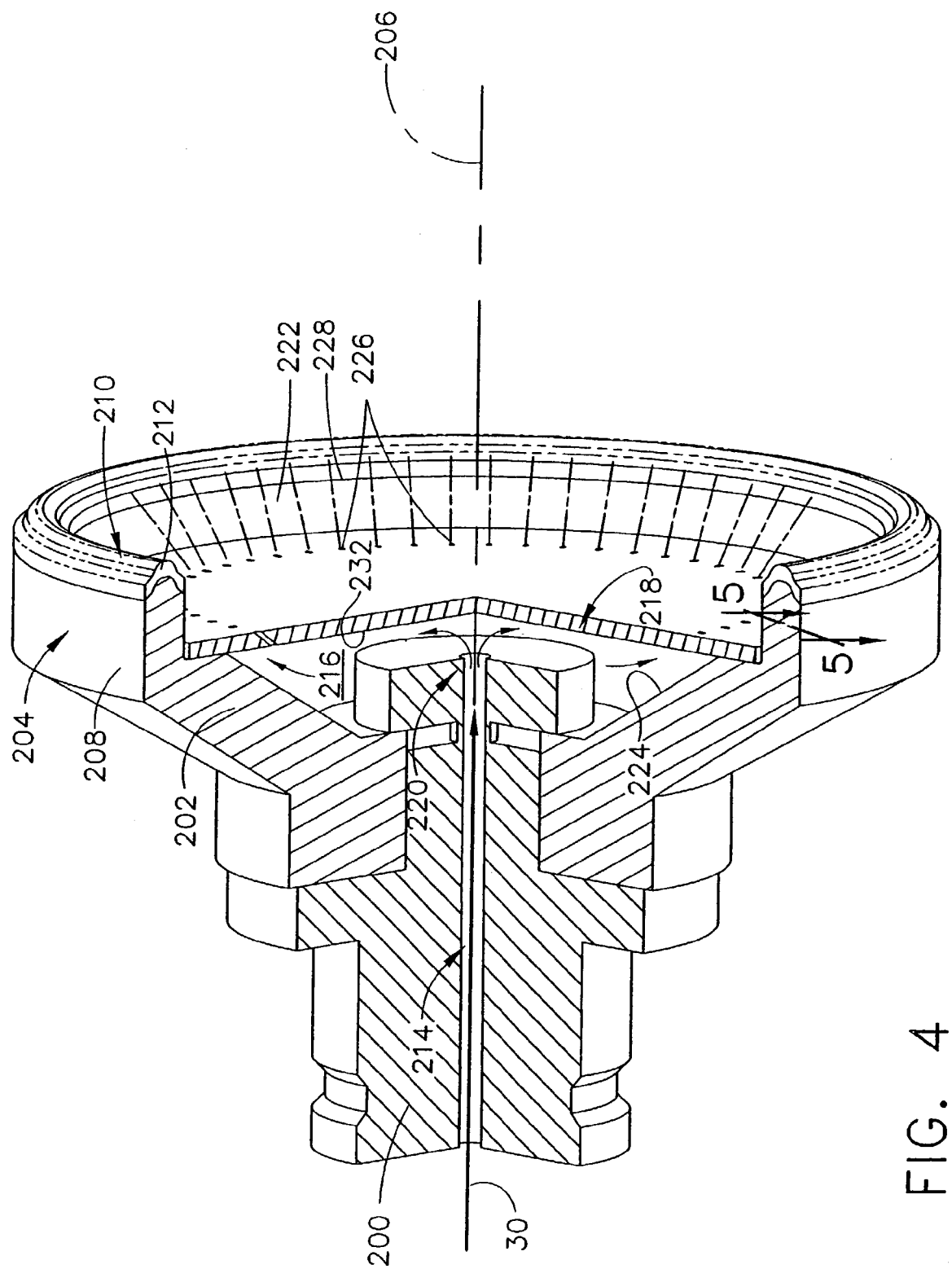
FIG. 4 is a perspective partial cutaway view of a portion of an exemplary grinding wheel for use with a machining assembly, such as the machining assembly shown in FIG. 3.
Figure 5:
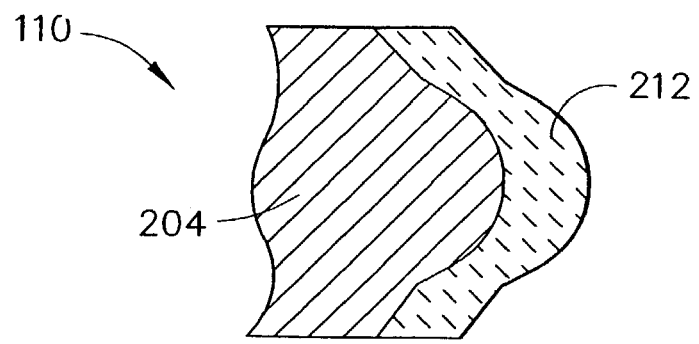
FIG. 5 is a cross-sectional view of a portion of the grinding wheel shown in FIG. 4.

FIG. 4 is a perspective partial cut-away view of a portion of an exemplary grinding wheel 110 for use with machining assembly 100 (shown in FIG. 3). FIG. 5 is a cross-sectional view of a portion of grinding wheel 110 and taken along line 5—5. In one embodiment, grinding wheel 110 is fabricated from aluminum oxide. In an alternative embodiment, wheel 110 is fabricated from cubic boron nitride (CBN). Grinding wheel 110 includes an arbor portion 200, a grinding wheel body 202, and a working projection 204. Arbor portion 200 is removably coupled to machine tool chuck 120 (shown in FIG. 3) in any suitable manner.

Grinding wheel working projection 204 extends outwardly from body 202 along an axis of rotation 206 and between a base 208 and a tip 210. Projection 204 is substantially annular and includes an abrasive working surface 212 adjacent tip 210. Surface 212 is configured to machine teeth troughs 44 and 46, such that teeth 32 are defined between adjacent troughs 44 or 46. In one embodiment, surface 212 is a vitrified abrasive surface.

A coolant passage 214 extends completely through arbor portion 200 and body 202 to a coolant chamber 216 defined within body 202 between a coolant plate 218 and a downstream end 220 of passage 214. In one embodiment, coolant passage 214 is substantially cylindrical and is concentrically aligned with respect to axis 206 and projection 204. Coolant passage 214 is coupled in flow communication with a source of coolant (not shown), and delivers cooling fluid to chamber 216. Coolant plate 218 is coupled to a radially inner surface 222 of projection 204 and a radially inner surface 224 of body 202. Coolant plate 218 includes a plurality of openings 226 for channeling coolant to projection 204, and more specifically towards abrasive surface 212. Coolant openings 226 each include a central axis 228 that extends obliquely towards surface 212 with respect to axis of rotation 206. More specifically, during operation, coolant 230 is channeled from the coolant source through passage 214 to chamber 216. Within chamber 216, coolant 230 is channeled across an upstream surface 232 of plate 218 and through openings 226, wherein the cooling fluid is then channeled towards abrasive surface 212.

Although grinding wheel projection 204 is herein described and illustrated in the exemplary manner, it should be understood that the particular geometry and cross-sectional shape of projection 204, and more specifically abrasive surface 212, will vary depending on the particular configuration and geometrical shape of coupling 10. The embodiment illustrated is intended as exemplary, and is not intended to limit the geometry and cross-sectional shape of projection 204 including abrasive surface 212.

Figure 6:
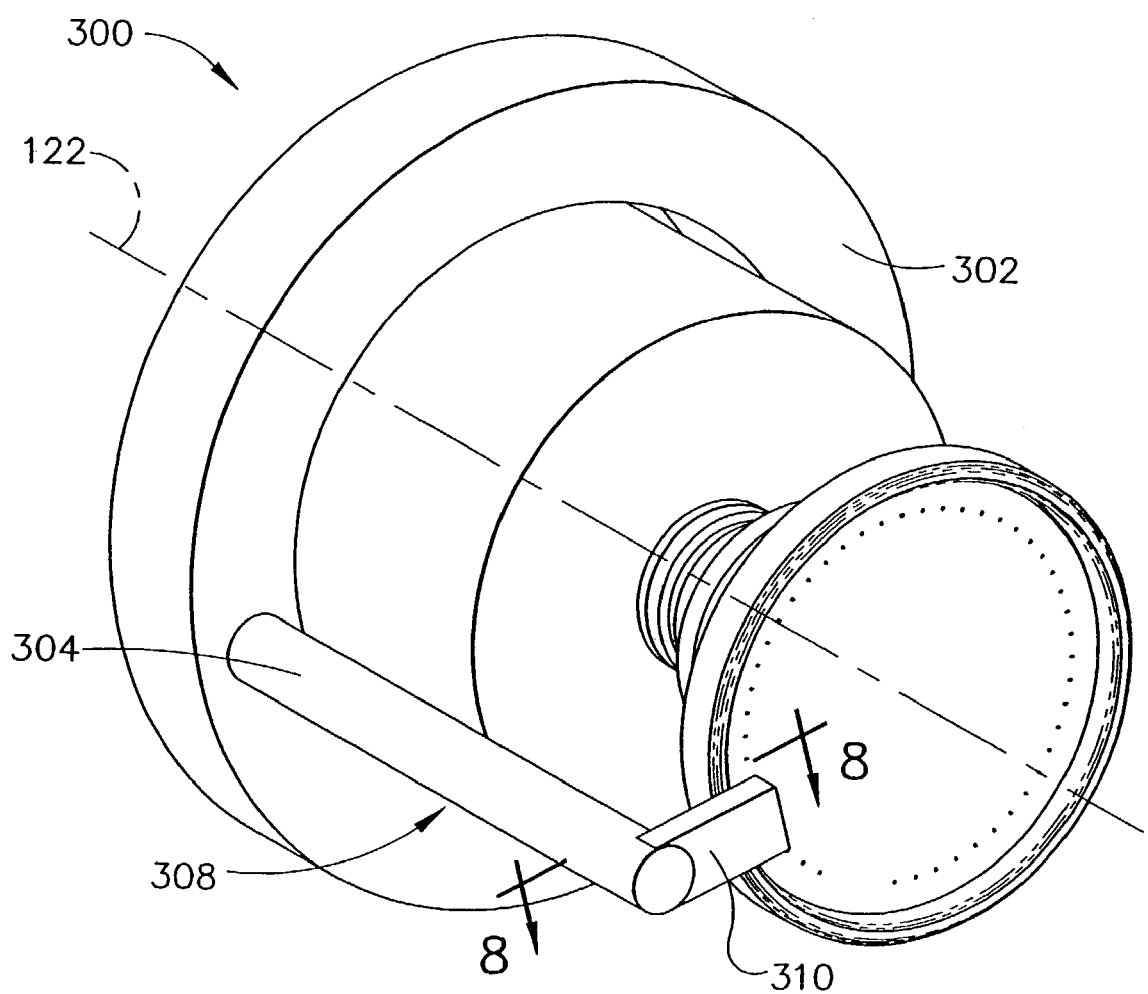
FIG. 6 is a perspective view of an exemplary scrubber assembly for a grinding wheel, such as the grinding wheel shown in FIG. 4, and in an operational.
Figure 7:
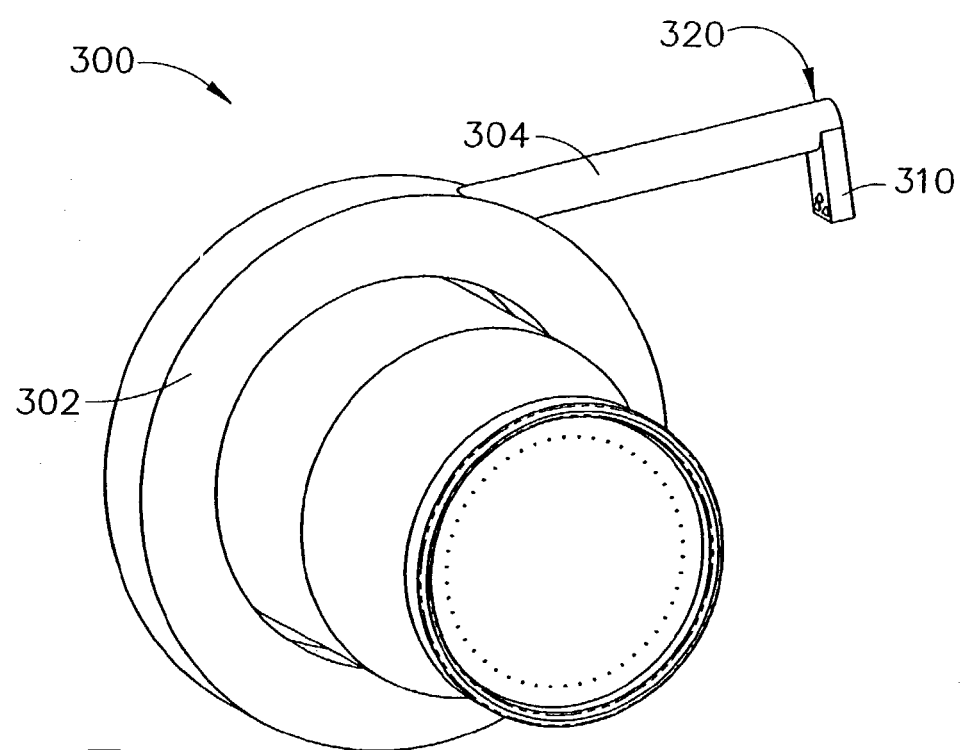
FIG. 7 is a perspective view of the scrubber assembly shown in FIG. 6 illustrating the scrubber assembly in a retracted position.
Figure 8:
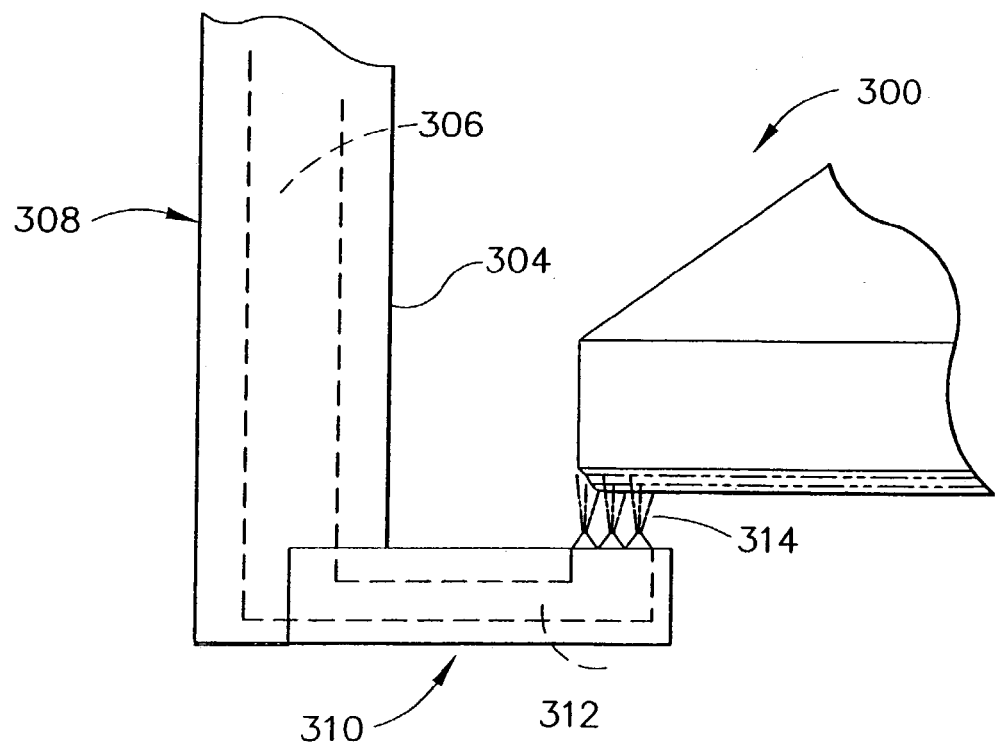
FIG. 8 is a cross-sectional view of a portion of the scrubber assembly shown in FIG. 6 and taken along line 8—8.

FIG. 6 is a perspective view of an exemplary scrubber assembly 300 for use with grinding wheel 110 (shown in FIG. 4), and in an operational position. FIG. 7 is a perspective view of scrubber assembly 300 scrubber assembly 300 in a retracted position. FIG. 8 is a cross-sectional view of a portion of scrubber assembly 300 taken along line 8—8. Assembly 300, as described below, supplies cleaning fluid, and includes a base 302 that is coupled to machine tool 104 (shown in FIG. 3) in any suitable manner. Base 302 is rotatable with respect to machine tool 104, with respect to machine tool chuck 120 (shown in FIG. 3), and about axis 122 (shown in FIG. 3).

Base 302 includes a first fluid duct 304 extending outwardly therefrom generally along axis 122 and having a fluid passageway 306 defined therein. First duct 304 extends outwardly along axis 122 to a downstream end 308 of duct 304. Passageway 306 is coupled in flow communication with a source of fluid (not shown). A second fluid duct 310 extends outwardly from first duct 304 and is substantially perpendicular to duct 304 and axis 122. In one embodiment, duct 304 is formed integrally with duct 310. In an alternative embodiment, duct 304 is an independent component fixedly coupled to duct 310. Second duct 310 includes a passageway 312 that is defined therein, and is in flow communication with passageway 306. Second duct 310 also includes a plurality of nozzles 314 that extend outwardly from duct 310 along axis 122 and towards chuck 120 and wheel 110.

Assembly 300 includes an operational position 316 (shown in FIG. 6), wherein during operation of machine tool 104, and more specifically grinding wheel 110, assembly 300 rotates around grinding wheel 110 such that nozzles 314 direct a coolant 318 delivered from passageways 306 and 312 to wheel 110, and more specifically abrasive surface 212 (shown in FIG. 4). Assembly 300 also includes a retracted position 320 (shown in FIG. 7), wherein assembly 300 does not deliver fluid for cleaning to wheel 110. More specifically, retracted position 320 may be used during a wheel 110, or tool 112 or 114, change, and also may be used when a conventional tool 112 or 114 is coupled to chuck 120.

Figure 9:
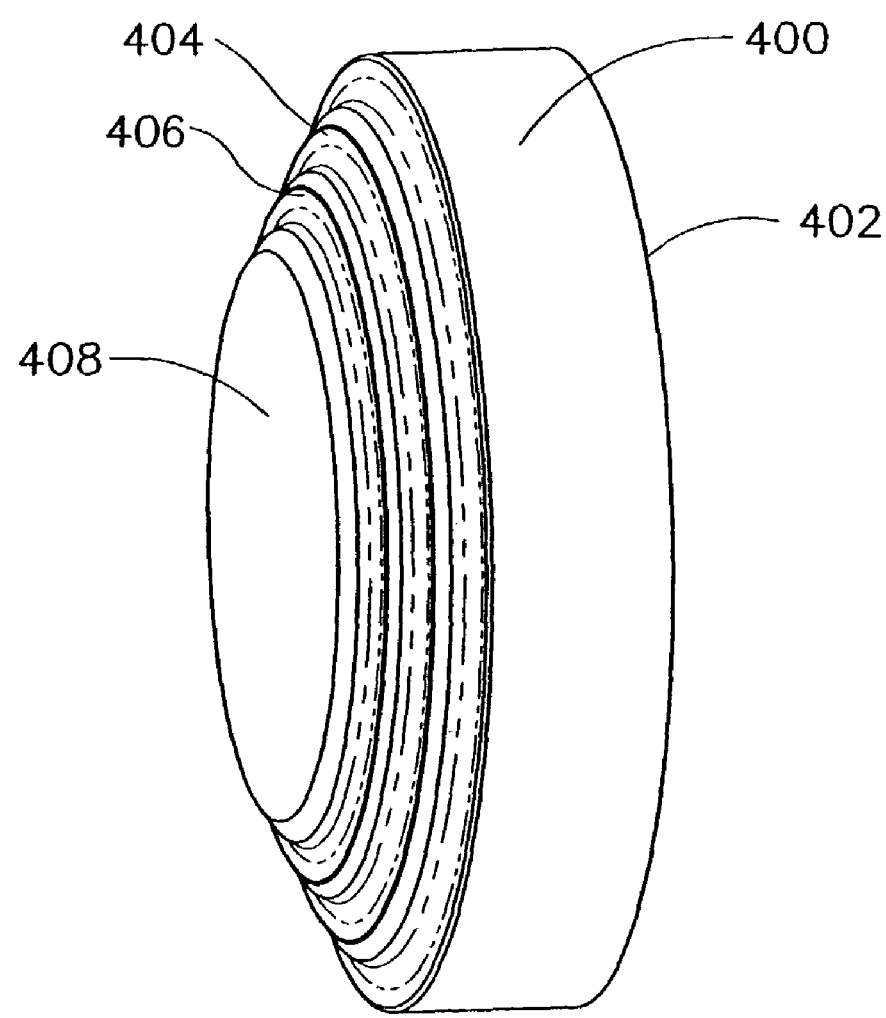
FIG. 9 is a perspective view of an exemplary dressing roll for use with a pallet assembly of a machining assembly, such as the machining assembly shown in FIG. 3.

FIG. 9 is a perspective view of an exemplary dressing roll 400 for use with pallet assembly 106 (shown in FIG. 3). As described above, dressing roll 400 is configured to removably couple to fixtures 134 (shown in FIG. 3) in any suitable manner. Roll 400 includes a first annular portion 402, a second annular portion 404 extending outwardly from first portion 402, a third annular portion 406 extending outwardly from second portion 404, and a fourth annular portion 408 extending outwardly from third portion 406. Second portion 404, third portion 406, and fourth portion 408 are each configured to dress at least one configuration of wheel 110

(shown in FIG. 4). In addition, other dressing rolls 400 may be coupled to assembly 106 to include even more configurations of wheel 110.

Furthermore, in combination with machine tool 104, dressing roll 400 provides a continuous-path dressing system. More specifically, machine tool 104 is configured to generally simultaneously position wheel 110 and dress wheel 110 using roll 400. In one embodiment, at least one of second portion 404, third portion 406, or fourth portion 408 includes diamond plating on an outer surface thereof for dressing wheel 110.

In operation, and referring now to FIGS. 1–9, an operator loads at least one coupling member 12 and 14 onto fixtures 134 and a particular coupling member configuration is chosen to be machined. Using automatic tool changer 116, assembly 100 chooses the appropriate grinding wheel 110 from carousel 108 and couples the chosen wheel 110 to chuck 120. In one embodiment, using automatic pallet changer 126, assembly 100 chooses a pallet 128 that contains an appropriate dressing roll 400 for dressing the chosen wheel 110, the dressing roll 400 is aligned with the chosen wheel 110, and machine tool 104 dresses the wheel 110 using roll 400. Assembly 100 then chooses a pallet 128 that contains a coupling member 12 or 14 desired to be machined, aligns the chosen coupling 12 or 14 with grinding wheel 110, and machines the chosen coupling 12 or 14 using the chosen grinding wheel 110. In the exemplary embodiment, assembly 110 is coupled to at least one processor (not shown) that facilitates executing the above-described method for machining a coupling 12 or 14.

The above-described machining assembly is cost-effective, highly reliable, and highly accurate for machining a coupling. More specifically, the assembly allows a plurality of coupling configurations to be machined without manually changing machine tools and machine fixtures, resulting in lower cycle times and possibly a reduced inventory. In addition, the above-described assembly provides improved cooling to a grinding wheel, and further provides a continuous path dressing system. Because of the above, the machining assembly facilitates machining a higher quality coupling having a decreased dimensional variation in a cost-effective and reliable manner.

Exemplary embodiments of machining assemblies are described above in detail. The systems are not limited to the specific embodiments described herein, but rather, components of each assembly may be utilized independently and separately from other components described herein. Each machining assembly component can also be used in combination with other machining assembly components.

While the invention has been described in terms of various specific embodiments, those skilled in the art will recognize that the invention can be practiced with modification within the spirit and scope of the claims.

What is claimed is:

1. A grinding wheel comprising:
   a body comprising a first end, a second end, a chamber defined therein between said first and second ends, and a centerline axis of symmetry extending therebetween, said chamber extending across said body;
   at least one grinding surface extending outwardly from said body second end and defining an end face of said grinding wheel;
   a cooling system extending through at least one of said body and said at least one grinding surface for supplying coolant to said at least one grinding surface, said chamber in flow communication with said cooling system for receiving coolant therein; and
   a plate extending between said chamber and said at least one grinding surface, said plate having an upstream surface and a downstream surface, said chamber configured to channel coolant across said upstream surface through a plurality of openings extending through said plate, said openings located inward of said grinding surface.

2. A grinding wheel in accordance with claim 1 wherein said body further comprises a first end, a second end, and a cooling passage, said at least one grinding surface extending from said body second end, said cooling passage extending axially through said body in flow communication between said body first end and said at least one grinding surface for discharging fluid from said body radially inward of said at least one grinding surface.

3. A grinding wheel in accordance with claim 1 wherein said plate is further configured to direct coolant towards said at least one grinding surface.

4. A grinding wheel in accordance with claim 3 wherein said openings spaced circumferentially within said plate and in flow communication with said chamber for discharging fluid radially inward from said grinding surface.

5. A grinding wheel in accordance with claim 4 wherein said openings are obliquely aligned with respect to said axis of symmetry extending through said grinding wheel.

6. A grinding wheel in accordance with claim 1 wherein said body further comprises an arbor portion for removably coupling said grinding wheel to a machine tool.

7. A grinding wheel in accordance with claim 1 wherein said at least one grinding surface comprises a vitrified abrasive surface.

* * * * *